United States Patent [19]

Stevens

[11] 4,426,260

[45] Jan. 17, 1984

[54] PREPARATION OF ALUMINUM ELECTROLYTIC CAPACITOR FOIL

[75] Inventor: James L. Stevens, Irmo, S.C.

[73] Assignee: U.S. Philips Corporation, New York, N.Y.

[21] Appl. No.: 405,668

[22] Filed: Aug. 6, 1982

[51] Int. Cl.³ .................. C25D 5/44; C25D 5/50; C25D 11/08

[52] U.S. Cl. .................. 204/33; 204/37 R; 204/58

[58] Field of Search .............. 204/33, 38 A, 58, 37 R; 361/433

[56] References Cited

U.S. PATENT DOCUMENTS

| | | | |
|---|---|---|---|
| 2,396,685 | 3/1946 | Coggins | 41/42 |
| 2,755,237 | 7/1956 | Turner | 204/33 X |
| 2,853,445 | 9/1958 | Catotti et al. | 204/33 X |
| 2,981,647 | 4/1961 | Schwartz | 204/33 X |
| 3,063,832 | 11/1962 | Snyder | 420/550 |
| 3,330,743 | 7/1967 | Jestl et al. | 204/33 |
| 3,988,217 | 10/1976 | Ikegaya | 204/33 |

FOREIGN PATENT DOCUMENTS

| | | | |
|---|---|---|---|
| 48-13222 | 4/1973 | Japan | 204/33 |
| 48-28123 | 8/1973 | Japan | 204/33 |
| 504559 | 4/1939 | United Kingdom . | |

OTHER PUBLICATIONS

Georgio; A. M., "The Electrolyte Capacitor", N.Y., Murray Hills Books, 1945, pp. 22-25 and 55-61.

Primary Examiner—G. L. Kaplan
Assistant Examiner—Nam X. Nguyen
Attorney, Agent, or Firm—Norman N. Spain

[57] ABSTRACT

The invention involves a method of preparing aluminum foil for use as an anode in electrolytic capacitors. The resultant electrolytic capacitor is improved by subjecting the etched aluminum foil to a heat treatment of 100° to 600° C. for about 10 seconds to 20 minutes prior to the treatment with nitric acid.

7 Claims, No Drawings

PREPARATION OF ALUMINUM ELECTROLYTIC CAPACITOR FOIL

FIELD OF THE INVENTION

This invention relates to a method of preparing aluminum foil for use as an anode in electrolytic capacitors.

BACKGROUND OF THE INVENTION

In general, aluminum anodes for use in electrolytic capacitors are formed by electrolytically etching aluminum foils and then electroforming the etched foils to form oxide coatings on the surfaces. It has been found that in order to obtain electrolytic capacitors of low leakage current it is necessary to employ aluminum foils of high purity, generally of a purity of greater than 99.96%. Further it has been found that the main impurity influencing the leakage current is the iron content in the foil. As a result, it has been further established that satisfactory capacitors are obtained only by use of aluminum foil containing not more than 0.010% by weight of iron.

However, the use of aluminum foils of such high purity has proved to be expensive and thus it is desirable to employ a less pure and therefore a less expensive aluminum foil.

A method employed in the art that enables the use of aluminum foil of low purity is shown in Japanese Patent Application No. 1011/78 filed Jan. 31, 1978 and open for inspection on August 1979. In this patent the use of aluminum foil of an aluminum content as low as 99.2% and an iron content as high as 0.33% is disclosed.

The method disclosed in this patent comprises first heat treating the foil at 450°–600° C. for a period of time of 10 to 60 minutes then dipping the foil in a solution of 2–20% phosphoric acid 60° C. for about 5–10 minutes and then dipping the foil into a 2–20% nitric acid solution temperature of 60° C. for about 2–20 minutes.

In Example II of this patent the application of this method to an aluminum foil of 99.2% purity and an iron content of 0.33% is shown to result in a leakage current decrease to 35 $\mu A$ from 350 $\mu A$.

Further, according to this patent, the function of the heating treatment is to deposit the iron impurities on the interfaces of the aluminum crystallite granules. The function of the aqueous phosphoric acid is to remove the iron impurities from the intergranular boundaries not from the surface aluminum foil. However, at the same time, a partially insoluble aluminum phosphate is formed on the surface of the aluminum foil. This may cause difficulties in the forming process. The phosphoric acid treated foil is therefore dipped into the nitric acid solution which acts to remove the aluminum phosphate from the surface of the foil.

However, the use of both nitric acid and phosphoric acid has proved to be costly both in regards to the cost of materials and in regard to the necessary expenditure of time. Further the use of the phosphoric acid results in the need for expensive waste control facilities.

SUMMARY OF THE INVENTION

A principal object of this invention is to provide a method for the use of low purity aluminum foil in electrolytic capacitors while decreasing the leakage current of such capacitors. Another object of this invention is to provide a method for treating low purity aluminum foils for the use in aluminum capacitors which avoids subjecting these aluminum foils to the action of phosphoric acid.

These and other objects of the invention will be apparent from the description that follows.

According to the invention the applicant has found a new and improved method for treating aluminum foil of low purity so as to improve the leakage current characteristics of electrolytic capacitors employing such a foil.

More particularly the applicant has provided a new method of treating aluminum foil of low purity to improve the leakage current characteristics thereof in which the use of a phosphoric acid treatment is avoided.

According to the invention the applicant has found that the leakage current of the capacitors employing aluminum foil of an iron content greater than about 0.010% is significantly decreased by subjecting such a foil to a method wherein the foil is electrolytically etched, the etched foil is treated with nitric acid and after being rinsed and dried the foil is then electroformed. By the use of the method of the invention, which avoids the use of phosphoric acid treatment, there is a significant improvement in the leakage current characteristics of the resultant electrolytic capacitor. It has further been found that by exposing the etched aluminum foil to 5 to 40% nitric acid at a temperature of about 25° C. to 95° C. for a period of about 10 seconds to 30 minutes the leakage current characteristics of the capacitor employing such a foil is at least as good as that produced by the method of the Japanese patent application.

While not necessarily to improve the leakage current characteristics thereof it has been found that the capacitance of the resultant electrolytic capacitor may be improved by subjecting the etched foil to a heat treatment of 100° to 600° C. for about 10 seconds to 20 minutes prior to the treatment with the nitric acid.

While improved results may be obtained with aluminum foil of an iron content of greater than 0.010% by weight it has been found that the greatest improvements have been found where the iron content is greater than about 0.025% and the aluminum content is 98%–99.95% by weight.

In order to improve the mechanical properties thereof it is preferable to anneal the foil subsequent to the treatment with the nitric acid and after rinsing and drying by heating the aluminum foil at 250° C. to 600° C. for 5 minutes to 12 hours.

However, it should be noted that the annealing treatment does not significantly increase the leakage current or the capacitance characteristics of the capacitor.

The etching procedure may be carried out by procedures well-known in the art. Thus, the etching can be carried out electrolytically, employing an aqueous salt or acid solution. For example, the methods disclosed in U.S. Pat. No. 3,728,237 or U.S. Pat. No. 3,755,115 (the contents of which are hereby incorporated by reference) may be employed.

DESCRIPTION OF PREFERRED EMBODIMENTS

The invention will now be described in greater detail with reference to the following examples.

EXAMPLE I

A section of a 9 micron thick 1193 aluminum foil, having a aluminum content of 99.93% by weight and an iron content of three hundred parts per million, is electrolytically etched according to standard procedures in an aqueous salt solution. The etched aluminum foil is then washed with ion-free water and dried at 85° to 100° C. The aluminum foil is then immersed for about 1 to 3 minutes specifically for 1 minute in a 20% solution of nitric acid maintained at a temperature of 65° C. followed by a deionized water rinse and a drying step.

Electroforming of the foil is then carried out by applying 52 volts to the foil while immersed in a 0.1% aqueous ammonium dihydrogen phosphate solution heated to 90° C.

The foil is then annealed by heating at 450° C. for five minutes.

A test capacitor assembled from the foil and tested for leakage at 85° C. with 40 V applied. A leakage of 0.7 $\mu$A/Vuf was obtained for 99.96% foil and 1.29 $\mu$A/Vuf for 99.93% foil which had no special treatment. 99.93% foils having the above treatment had leakages of 0.83 $\mu$A/Vuf.

This value may be compared to a sample of etched 99.96% aluminum which had a leakage of 0.75 $\mu$A/Vuf after identical treatment.

EXAMPLE II

A section of an 1193 aluminum foil similar to that employed in Example I is treated in the same manner except that in place of the treatment with nitric acid for 1 minute the foil is treated with 1% of phosphoric acid for 3 minutes. A test capacitor similar to that tested in Example I but employing the same foil under the same conditions shows a leakage of 1.24 $\mu$A/Vuf.

A test capacitor assembled from an 1193 aluminum foil that is subjected to the same treatment with the exception that no acid treatment is carried out after etching exhibits a leakage of 1.29 $\mu$A/Vuf.

EXAMPLE III

A section of 1193 aluminum foil similar to example I is treated in the same manner except that a heat treatment of 2 minutes at 550° C. is added before the nitric acid treatment. Test capacitors made of this foil give the same low leakage level (0.83 $\mu$A/Vuf.). The principal advantage here is that no capacitance is lost as compared to a loss of 10 to 20% in example I.

It will be apparent that various modifications may be made to the methods of the present invention without departing from the scope as defined by the following claims.

What is claimed is:
1. A method of treating aluminum foil of an iron content of greater than about 0.010% by weight for use in electrolytic capacitors so as to reduce the leakage current of said capacitors, while maintaining the capacitance of said capacitors, said method consisting essentially of
   a. electrolytically etching aluminum foil of an iron content of greater than about 0.010% by weight,
   b. heating said etched aluminum foil at a temperature of 100° C. to 600° C. for about 10 seconds to 20 minutes,
   c. treating said aluminum foil with 5–40% nitric acid at a temperature of 25° C. to 95° C. for a period of 10 seconds to 30 minutes, said treatment with nitric acid being carried out at a temperature and for a length of time at least sufficient to cause a reduction in the leakage current of said capacitors and being the sole mineral acid treatment of said electrolytically etched foil,
   d. rinsing said aluminum foil with water and drying said aluminum foil and
   e. electroforming said aluminum foil to thereby oxidize the surfaces thereof.
2. The method of claim 1 wherein subsequent to the treatment with the nitric acid but prior to electroforming the aluminum foil is annealed by heating at a temperature of about 250° C.–600° C. for about 5 minutes to 16 hours.
3. The method of claim 2 wherein subsequent to the etching treatment but prior to the treatment with nitric acid the aluminum foil is rinsed with water and dried.
4. The method of claim 2 wherein the aluminum content of the foil prior to etching is about 98%–99.95% by weight.
5. The method of claim 1 wherein the aluminum content of the foil prior to etching is about 98%–99.95% by weight.
6. The method of claim 5 wherein the aluminum content of the foil prior to etching is about 99.93% by weight, the etched aluminum foil is treated with 20% nitric acid at a temperature of about 65° C. for about 1 to 3 minutes.
7. The method of claim 6 wherein the etched aluminum foil is heated at a temperature of about 550° C. for about 2 minutes prior to the treatment with the nitric acid.

* * * * *

UNITED STATES PATENT AND TRADEMARK OFFICE
CERTIFICATE OF CORRECTION

PATENT NO. : 4,426,260
DATED : January 17, 1984
INVENTOR(S) : JAMES L. STEVENS

It is certified that error appears in the above—identified patent and that said Letters Patent is hereby corrected as shown below:

In the title page:

(73) Assignee

Change "U.S. Philips Corporation" to
--North American Philips Corporation--.

Signed and Sealed this

Eleventh Day of June 1985

[SEAL]

Attest:

DONALD J. QUIGG

Attesting Officer     Acting Commissioner of Patents and Trademarks